United States Patent
Baudu et al.

[11] Patent Number: 6,145,786
[45] Date of Patent: Nov. 14, 2000

[54] LATCHING MECHANISM FOR A JET ENGINE THRUST REVERSER DOOR

[75] Inventors: Pierre André Marcel Baudu, Le Havre; Patrick Gonidec, Montivilliers; Guy Bernard Vauchel, Le Havre, all of France

[73] Assignee: Hispano-Suiza Aerostructures, France

[21] Appl. No.: 09/053,776

[22] Filed: Apr. 2, 1998

[30] Foreign Application Priority Data

Apr. 3, 1997 [FR] France ................................. 97 04048

[51] Int. Cl.[7] ................................................. B64C 25/68
[52] U.S. Cl. ............................................................. 244/110 B
[58] Field of Search ................... 244/110 B; 239/265.19, 239/265.23, 265.25, 265.27, 265.29

[56] References Cited

U.S. PATENT DOCUMENTS

| 4,174,128 | 11/1979 | Styck . | |
|---|---|---|---|
| 4,414,828 | 11/1983 | Takinami et al. . | |
| 4,437,783 | 3/1984 | Halin et al. | 239/265.27 |
| 4,966,327 | 10/1990 | Fage et al. | 239/265.29 |
| 5,192,023 | 3/1993 | Fage et al. | 239/265.29 |
| 5,310,117 | 5/1994 | Fage et al. | 239/265.29 |
| 5,404,714 | 4/1995 | Davies | 239/265.29 |
| 5,547,130 | 8/1996 | Davies | 239/265.29 |
| 5,735,557 | 4/1998 | Harvey | 239/265.29 |
| 5,775,639 | 7/1998 | Fage | 244/110 B |
| 5,819,527 | 10/1998 | Fournier | 244/110 B |
| 5,953,904 | 9/1999 | Mountney | 239/265.29 |

FOREIGN PATENT DOCUMENTS

| 0 534 833 | 3/1993 | European Pat. Off. . |
|---|---|---|
| 0 656 469 | 6/1995 | European Pat. Off. . |
| 759891 | 10/1956 | United Kingdom . |

Primary Examiner—Peter M. Poon
Assistant Examiner—Judith A. Nelson
Attorney, Agent, or Firm—Bacon & Thomas PLLC

[57] ABSTRACT

A latching mechanism is disclosed for a jet engine thrust reverser having a thrust reverser door movably connected to an engine cowling with a reverse thrust opening, the thrust reverser door being movable between a forward thrust position, in which the thrust reverser door covers the reverse thrust opening, and a reverse thrust position, in which the reverse thrust opening is uncovered. The latching mechanism has a lock bar mounted on the thrust reverser door, the lock bar having a distal end, and a latch member pivotally located on the cowling, the latch member having a slot engaged by the distal end of the lock bar when the thrust reverser door is in the forward thrust position. The latch member is movable between a latched position, in which the latch member prevents disengagement of the distal end of the lock bar from the slot, so as to lock the thrust reverser door in the forward thrust position, and an unlatched position which permits disengagement of the distal end of the lock bar from the slot. The latching mechanism also includes a hook member connected to the cowling and located so as to engage the distal end of the lock bar upon relative movement between the cowling and the thrust reverser door away from each other in a direction generally parallel to a longitudinal axis of the cowling, such engagement preventing disengagement of the distal end of the lock bar from the slot and displacement of the thrust reverser door from the forward thrust position.

13 Claims, 4 Drawing Sheets

LATCHING MECHANISM FOR A JET ENGINE THRUST REVERSER DOOR

BACKGROUND OF THE INVENTION

The present invention relates to a latching mechanism for the thrust reverser door of a jet engine, more particularly such a latching mechanism that will retain the thrust reverser door in the forward thrust position despite catastrophic failure of the jet engine components.

Aircraft jet engine thrust reversers are well-known in the art and enable the propulsive gas flow from the turbojet engine to be re-directed in a direction having a reverse thrust component for slowing or braking the aircraft. Pivoting door type thrust reversers are also well known in which one or more thrust reverser doors are pivotally attached to an engine cowling so as to be movable between forward thrust positions, in which the propulsive gases are directed in a forward thrust direction, and reverse thrust positions, in which the pivoting doors re-direct at least a portion of the propulsive gas flow into a direction having a reverse thrust component. Typically, such pivoting door type thrust reversers cover a reverse thrust opening through the cowling when in the forward thrust position and open the reverse thrust opening when in the reverse thrust position. The engine cowling may have a front frame to which the thrust reverser door actuator is mounted, the opposite end of the actuator being attached to the thrust reverser door. Longitudinally extending beam portions of the cowling connect the front frame of the cowling to a rear cowling portion and extend between circumferentially spaced apart thrust reverser doors. The thrust reverser doors may be pivotally attached to the beams on opposite lateral sides of the reverse thrust opening.

Thrust reversers also must include devices for locking the thrust reverser doors in their forward thrust positions. Known locking means typically comprise a latch affixed to the front frame structure of the cowling and a cooperating portion of the latch situated at a front portion of the thrust reverser door. Typically such locking devices are located at the front portion of the thrust reverser door and a corresponding location on the front frame of the cowling, but may also be located at opposite lateral sides of the door and corresponding locations on the cowling. Generally, the pivoting thrust reverser doors have their pivot axes located towards the rear of the thrust reverser door and are, therefore, self-opening due to the pressurized gases within the gas flow duct bounded by the cowling and the thrust reverser doors acting on the inner surfaces of the thrust reverser doors. It is also known to provide such thrust reverser doors with pivot axes located toward the forward portion of the doors, thereby rendering them self-closing by the pressurized gases acting on their inner surfaces. Usually pivoting door type thrust reversers have the forward portions of the thrust reverser doors move outwardly from the cowling when moving into the reverse thrust positions, although "scoop" type doors are also known in which the forward portion of the thrust reverser door moves inwardly into the gas flow duct.

As can be imagined, inadvertent deployment of the thrust reverser door to the reverse thrust position during aircraft flight may be catastrophic. Therefore, it is known to utilize redundant locking devices to prevent such inadvertent deployment. Despite these precautions, redundant latching and locking systems may be rendered ineffective in two situations. If a turbine rotor ruptures, severe damage may be caused to the jet engine, the cowling and to the thrust reversers. The debris from the ruptured motor may cause twisting of the front frame which, in turn, may cause force to be applied to the locks which may then disengage and no longer hold the thrust reverser door in its forward thrust position. In such instance, although the locks may be functional, the damage to the front frame, to which the locks are attached, may cause the lock portions to disengage. This problem is worsened when larger locking devices are utilized, since the probability of the locking device itself being impacted by the rotor debris is increased. Secondly, a fire in the turbojet engine may also cause the release of the locking devices due to the fire's effect on the control system for opening and closing the locking systems. Consequently, a fail-safe locking mechanism must address this possibility and preclude the opening of the thrust reverser door under these circumstances.

Even under normal operating circumstances, the stresses imposed upon the locking device are severe. Consequently, a reduction of these stresses will be advantageous and could prevent premature failure of the locking devices.

SUMMARY OF THE INVENTION

A latching mechanism is disclosed for a jet engine thrust reverser having a thrust reverser door movably connected to an engine cowling with a reverse thrust opening, the thrust reverser door being movable between a forward thrust position, in which the thrust reverser door covers the reverse thrust opening, and a reverse thrust position in which the reverse thrust opening is uncovered. The latching mechanism has a lock bar mounted on the thrust reverser door, the lock bar having a distal end, and a latch member pivotally located on the cowling, the latch member having a slot engaged by the distal end of the lock bar when the thrust reverser door is in the forward thrust position. The latch member is movable between a latched position, in which the latch member prevents disengagement of the distal end of the lock bar from the slot, so as to lock the thrust reverser door in the forward thrust position, and an unlatched position which permits disengagement of the distal end of the lock bar from the slot. The latching mechanism also includes a hook member connected to the cowling and located so as to engage the distal end of the lock bar upon relative movement between the cowling and the thrust reverser door away from each other in a direction generally parallel to a longitudinal axis of the cowling, such engagement preventing displacement of the thrust reverser door from the forward thrust position.

The hook member is located so as to engage the distal end of the lock bar thereby preventing deployment of the thrust reverser door from the forward thrust position when the stationary structure or the thrust reverser door is warped or displaced due to catastrophic failure of the jet engine components. The hook member may be mounted directly to the front frame or other stationary structure on the cowling, or, as in a preferred embodiment, the hook member may extend from a case of the latching mechanism which actuates the latch member. Such construction enables existing thrust reversers to be readily modified to incorporate the present invention simply by changing the existing latch mechanism.

The hook member may include a base portion, a hook portion and a connecting portion connecting the hook portion to the base portion. It may also include lateral side members on opposite lateral sides and connected to the base, connecting and hook portions. This structure defines an interior space in which the latch member is located and an opening through which the lock bar extends when the thrust reverser door is in the forward thrust position.

The hook member, alternatively, may have a bearing surface located adjacent to the distal end of the lock bar when the thrust reverser door is in the forward thrust position and extending substantially parallel to the path of travel of the distal end as the thrust reverser door moves between its forward and reverse thrust positions. Should catastrophic failure of an engine component occur, the bearing surface will come into contact with the distal end of the lock bar to prevent release of the lock bar from the latch member to thereby retain the thrust reverser door in the forward thrust position.

The base portion of the hook member may also be located so as to contact the distal end of the lock bar when the thrust reverser door is in its forward thrust position to act as a stop and accurately position the door relative to the cowling. Such contact reduces the stresses applied to the latch member, since it no longer must function as a stop and a locating device.

The hook member may be pivotally attached to the lock case so as to be movable between a displaced position, in which the hook portion is displaced from the distal end of the lock bar, thereby permitting deployment of the thrust reverser door between the forward and reverse thrust positions, and an engaged position in which the hook member engages the distal end of the lock bar to prevent deployment of the thrust reverser door from the forward thrust position. The hook member is spring biased into the engaged position and is maintained in the displaced position by a fusible link connected to the hook member and to an adjacent stationary structure such as the lock case, or the front frame of the cowling. In the event of an engine fire, the fusible link will melt, thereby enabling the hook member to assume the engaged position, due to the spring bias, and thereby prevent inadvertent deployment of the thrust reverser door from the forward thrust position.

DETAILED DESCRIPTION OF THE PREFERRED EMBODIMENTS

Figure 1:
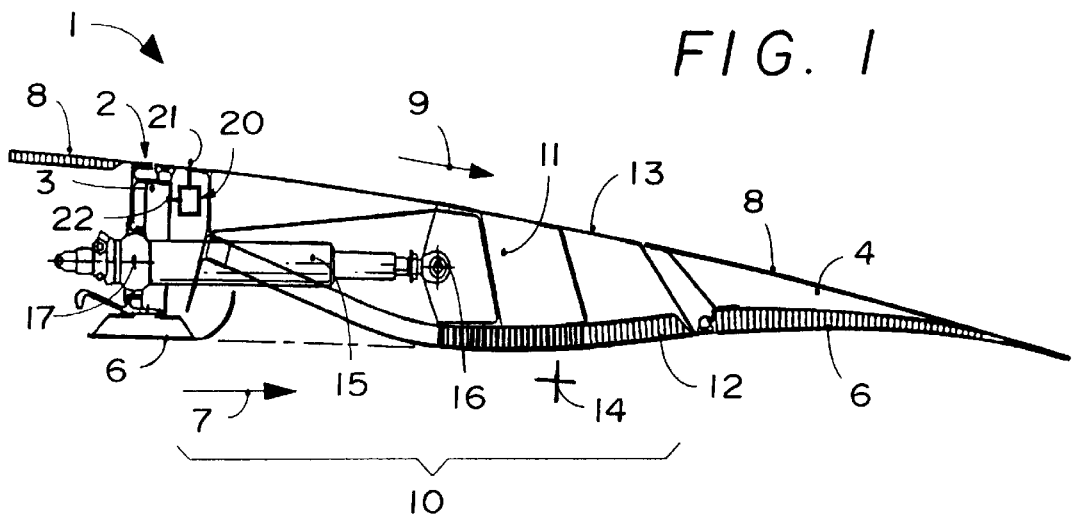
FIG. 1 is a partial, longitudinal cross-sectional view of a thrust reverser incorporating the latching mechanism according to the present invention.

The thrust reverser 1, as illustrated in FIG. 1, has a shape of a general body of revolution about a turbojet engine (not shown). The structure of the cowling comprises a stationary forward structure 2 having front frame 3 and a rear cowling portion 4. A reverse thrust opening 10 is defined between the front frame 3 and the rear cowling portion 4, the lateral sides of the reverse thrust opening being bounded by a plurality of longitudinally extending cowling portions connecting the front cowling structure 2 to the rear cowling portion 4. Front and rear cowling portions 2 and 4, respectively, have inner walls 6 which form an outer boundary of a gas flow duct in which the propulsive gases flow in the direction of arrow 7, and outer walls 8 on which the ambient air flows during aircraft flight in the direction of arrow 9.

The reverse thrust opening 10 is covered by a thrust reverser door 11, having an inner wall 12 and an outer wall 13, respectively. The inner wall 12 forms a portion of the outer boundary of the gas flow duct and is substantially flush with the inner wall 6 of the cowling, while the outer wall 13 of the thrust reverser door is substantially flush with the outer cowling surface 8 when the thrust reverser door 11 is in the forward thrust position, as illustrated in FIG. 1. The thrust reverser door 11 is pivotable about pivot axis 14 between the forward thrust position, illustrated in FIG. 1, and a reverse thrust position, in which the forward portion of the door (towards the left as illustrated in FIG. 1) is displaced outwardly from the forward cowling portion 2 and the rear portion of the thrust reverser door (towards the right as illustrated in FIG. 1) is displaced inwardly into the gas flow duct. In the reverse thrust position, at least a portion of the gases flowing through the gas flow duct are re-directed outwardly through the reverse thrust opening 10 to provide thrust reverse forces to the aircraft structure.

A linear door actuator 15 is connected at one end by a swivel 17 to the front frame 3, while an extendable and retractable rod is pivotably connected to the thrust reverser door by pivot 16. The extension and retraction of the rod moves the thrust reverser door 11 between the forward and reverse thrust positions.

The thrust reverser door 11 is maintained in the forward thrust position by latching mechanism 20 which implements a mechanical connection between at least one site 21 on the thrust reverser door 11 and at least one site 22 on the cowling structure 2. Generally, the linkage site 21 on the thrust reverser door 11 is located on a forward edge of the door, while the corresponding linkage site 22 is located on the front frame 3. However, it is to be understood that other locations may be utilized without exceeding the scope of this invention.

Figure 2:
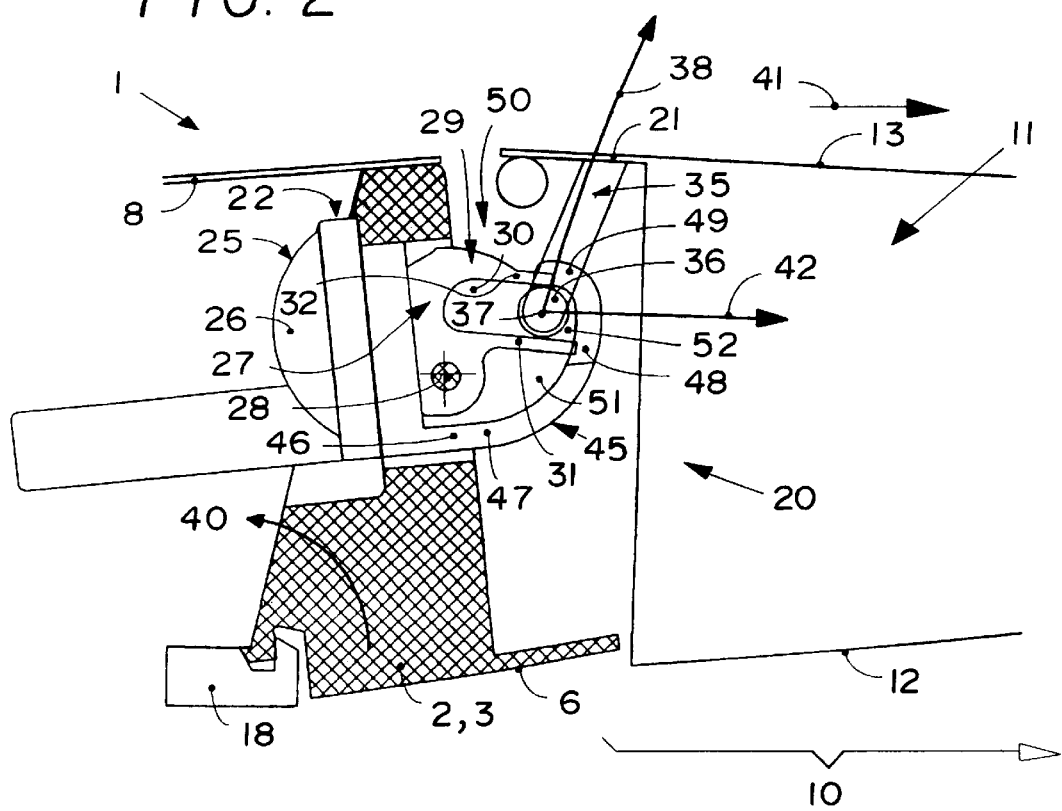
FIG. 2 is a cross-sectional view of a first embodiment of the latching mechanism according to the present invention.

One embodiment of the latching mechanism 20 is illustrated in cross-section in FIG. 2. As can be seen, the front frame 3 is connected to an outer casing 18 of the turbojet engine (not shown). The latching mechanism 20 comprises a lock device 25 having a case 26 rigidly affixed to the front frame 3 and having a latch member 27 pivotally connected to the case 26 so as to pivot about transverse axis 28 between a latched position, illustrated in FIG. 2, and an unlatched position, in which the latch member 27 pivots counterclockwise about the axis 28. The latch member 27 comprises a forked portion 29 having an elongated notch or slot 30 bounded on opposite sides by first and second legs 31 and 32, respectively. The latching mechanism further comprises a lock bar 35 rigidly affixed to a forward edge of the thrust reverser door 11 at the linkage site 21, the lock bar 35 having a distal end 36, which may comprise a roller rotatable with respect to the lock bar 35 about axis 37. The path of the distal end 36 of the lock bar when the thrust reverser door 11 moves between the forward and reverse thrust positions is illustrated by arrow 38. As the thrust reverser door 11 approaches the forward thrust position, the distal end 36 will engage the outwardly facing slot 30 of the latching member which will then pivot about axis 28 to the latch position, illustrated in FIG. 2. In this position, the distal end 36 of the lock bar 35 bears against a surface of the leg 31 to pivot the latch member 27 about axis 28 into the latched position. In the latched position, the leg 32 of the latch member 27 contacts an opposite side of the distal end 36 to prevent movement of the distal end 36 along the path 38 and, consequently, to prevent the deployment of the thrust reverser door 11 from the forward thrust position. The lock member 25 retains the latch member 27 in its latched position, as is well known in the art.

Should a turbine motor of the jet engine rupture, the debris from the ruptured disk may pass through the turbojet engine casing and cause damage to the thrust reverser 1, thereby degrading its structural integrity and possibly deforming the thrust reverser. In particular, the front frame 3 may be twisted in the direction denoted by arrow 40, or the structure mounting the door may be damaged causing the thrust reverser door 11 to be shifted rearwardly relative to the cowling in the direction of arrow 41. Such damage, therefore, could cause the distal end 36 of the lock bar 35 to disengage from the latch member 27 and enable the thrust reverser door 11 to be inadvertently deployed to the reverse thrust position. Movement of the thrust reverser door in the direction of arrow 41 will cause the distal end 36 of the lock bar 35 to move in the direction of arrow 42, resulting in possible disengagement from the latch member 27. To prevent such disengagement of the distal end 36 from the latch member 27, the present invention incorporates a hook member 45 which comprises a base portion 47 connected to the case 26 at 46 and extending therefrom, a connecting portion 48 and a hook portion 49 which curves back towards the case 26 adjacent to the distal end 36 of the lock bar 35 when the thrust reverser door is in the forward thrust position. The hook member has an opening 50 facing outwardly between an end of the hook portion 49 and the case 26 of the lock device 25, or the front frame 3. The base portion 47 is located opposite to the opening 50. As can be seen in FIG. 2, the direction of movement of distal end 36, along arrow 38, enables the distal end 36 to pass through the opening 50 when the thrust reverser door 11 approaches and enters the forward thrust position. When the latch member 27 moves to the latched position, leg 32 will prevent movement along the path 38, thereby trapping the distal end 36 of the lock bar 35 within the space 51 of the hook member 45. Any movement of the front frame 3 in the direction of arrow 40, or movement of the distal end 36 in the direction of arrow 42 will cause the hook portion 49 to engage the distal end 36 of the lock bar 35 thereby positively preventing inadvertent deployment of the thrust reverser door 11 from the forward thrust position upon catastrophic failure of a turbine rotor or other engine component.

Under normal operating circumstances, a clearance 52 is present between the distal end 36 of the lock bar 35 and an inner surface of the hook portion 49. However, any movement of the front frame 3 in the direction of arrow 40, or the distal end 36 in the direction of arrow 42 will eliminate clearance 52 and cause the hook portion 49 to engage the distal end 36. The engagement of the hook portion 49 with the distal end 36 also prevents any excessive stresses from being imposed upon the latch member 27 thereby preventing inadvertent movement of the latch member 27 toward the unlatched position.

Figure 3:
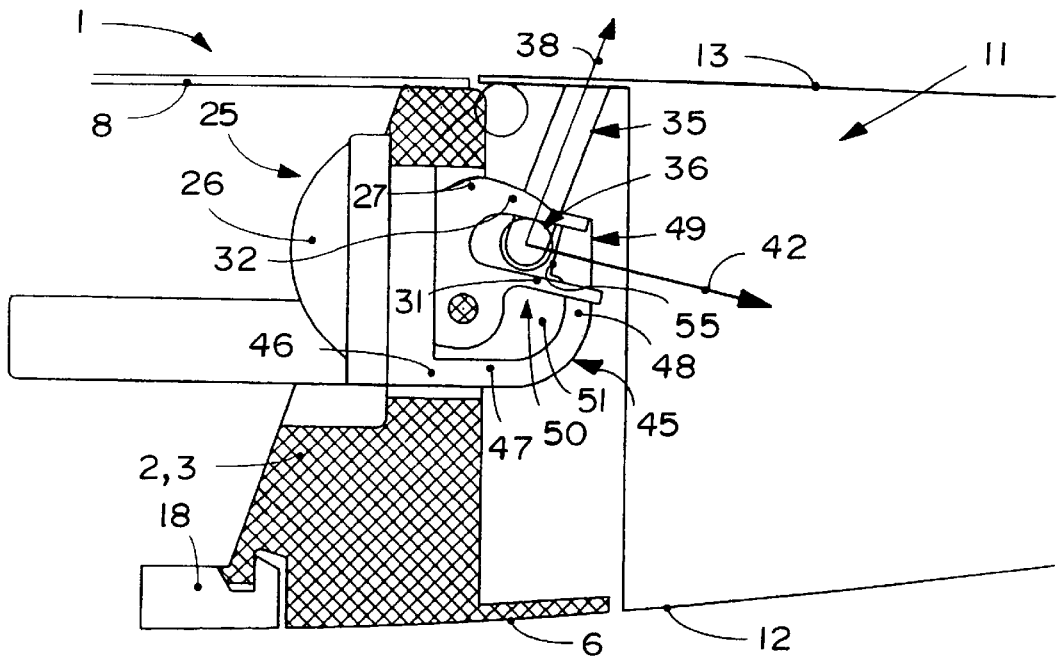
FIG. 3 is a cross-sectional view of a second embodiment of the latching mechanism according to the present invention.

An alternative embodiment is illustrated in FIG. 3 which is identical to the previously described embodiment except for the configuration of the hook portion 49. As can be seen, in this embodiment, the hook portion 49 has a bearing surface 55 that is located adjacent to the distal end 36 when the thrust reverser door 11 is in the forward thrust position. The bearing surface 55 extends substantially parallel to the path of travel 38 of the distal end 36 as the thrust reverser door moves between the forward and reverse thrust positions. There is normally a clearance between the bearing surface 55 and the distal end 36, but should any catastrophic failure of the structure occur tending to move the distal end 36 in the direction of arrow 42, such movement will be prevented by contact between the distal end 36 and the bearing surface 55. Such contact will prevent any further movement of the distal end 36 and prevent its disengagement from the elongated slot 30 in the latch member 27. Since the bearing surface 55 extends substantially perpendicular to the direction of movement along arrow 42 contact between the distal end 36 and the bearing surface 55 does not impose any additional stresses on the legs 31 and 32 of the latch member 27.

Figure 4:
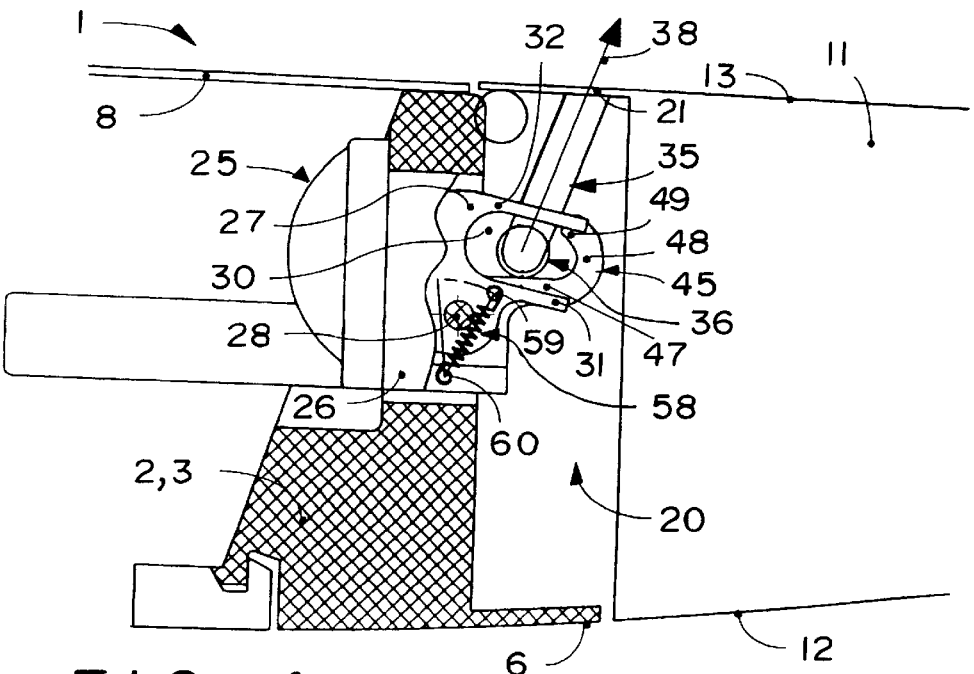
FIG. 4 is a cross-sectional view of a third embodiment of the latching mechanism according to the present invention.

In the embodiment illustrated in FIG. 4, the base portion 47 of the hook member 45 is located so as to act as a stop against which the distal end 36 of the lock bar 35 bears when the thrust reverser door 11 is in its proper forward thrust position. The leg 31 of the latch member 27 is located slightly displaced out of contact with the distal end 36 when the latch member 27 is in its latched position, as is leg 32. This embodiment avoids the placement of additional stresses on the latch member 27 by relieving this member of the function of acting as a stop for the thrust reverser door. Preferably, the base portion 47 is substantially perpendicular to the path of travel 38 of the distal end 36 in order to avoid any lateral reactions that must be absorbed by the door pivots and in order to optimize the locking torque relative to the pivot attachments.

As in the previously described embodiments, a self-closing lock mechanism 25 may be used in which the latch member 27 comprises an over-center device with two stable positions, one stable position comprising the latched position, and the other stable position comprising the unlatched position. A biasing spring 58 is connected between the latch member 27 at 59 and to the casing 26 at 60 and is located such that, in one stable position, the biasing spring 58 is located on one side of the pivot axis 28, while in the other stable position, the biasing spring 58 is located on an opposite side of the pivot axis 28.

When the thrust reverser door is in the reverse thrust position, latch member 27 is located such that the elongated slot or notch 30 faces in the direction of travel 38 of the distal end 36. As the thrust reverser door approaches the forward thrust position, engagement of the distal end 36 with the leg 31 will cause the latch member 27 to pivot about axis 28. Once the biasing spring 58 passes across the pivot axis 28, it will then urge the latch member 27 toward the latched position, illustrated in FIG. 4. The thrust reverser door 11 continues movement until the distal end 36 contacts the base portion 47 of the hook member 45. This embodiment offers the dual advantages of accurately positioning the thrust reverser door 11 in its forward thrust position relative to the stationary cowling 2 and by avoiding any stresses on the legs 31 and 32 of the latch member 27 when in the forward thrust position. This structure is also advantageous for self-closing pivoting doors 11 since the forces exerted on the stationary structure by the thrust reverser door when in the forward thrust position is absorbed by the base portion 47 and not the legs 31 and 32 of the latch member 27.

Figure 5:
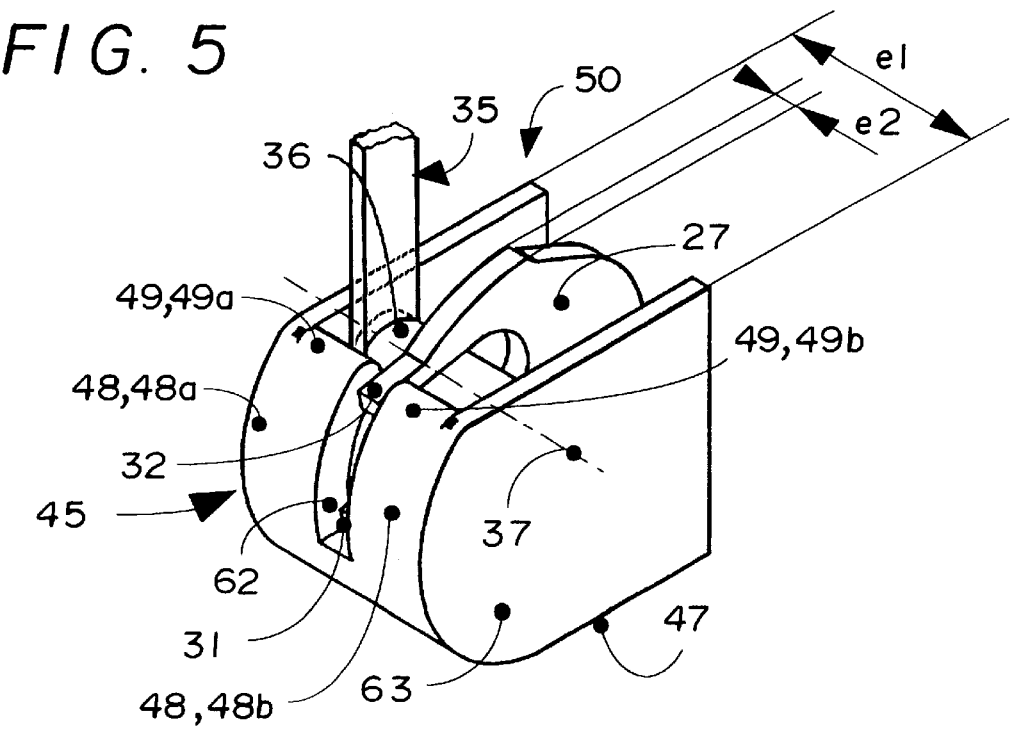
FIG. 5 is a perspective view of an alternative construction of the latching mechanism according to the present invention.
Figure 6:
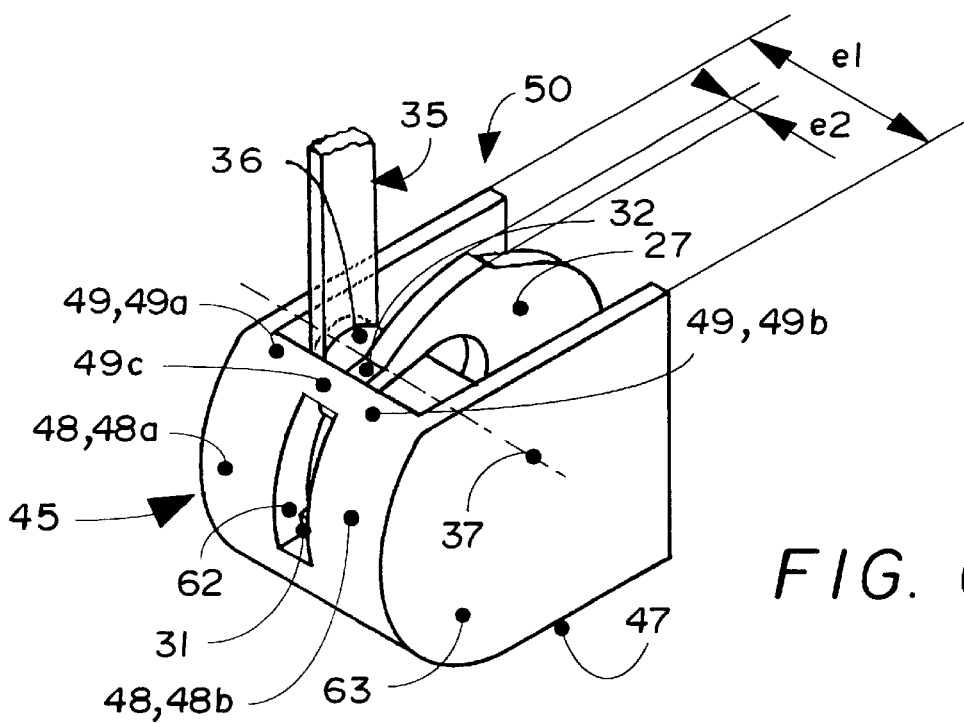
FIG. 6 is a perspective view of another alternative construction of the latching mechanism according to the present invention.

FIGS. 5 and 6 illustrate constructional details of the latching mechanisms according to the present invention. Although, in these figures, a single lock bar 35 is illustrated for clarity, it is to be understood that the lock bar may include two such lock bars 35 with the distal end 36 extending between the two lock bars. In the version illustrated in FIG. 5, the hook portion 49 of the hook member 45 is divided into laterally spaced portions 49a and 49b by slot 62. Similarly, slot 62 divides the connection portion 48 into laterally spaced portions 48a and 48b. The slot 62 is located such that when the latch member 27 is in the latched position, the distal ends of legs 31 and 32 engage the slot 62. The opposite sides of slot 62 will absorb any lateral stresses and prevent damage to the latch member 27 by such stresses.

The construction illustrated in FIG. 6 is similar to that in FIG. 5, except for yoke 49c which extends across the slot 62 and interconnects the opposite ends 49a and 49b of the hook portion 49. In this construction, the end of leg 31 enters the slot whereas the leg 32 of the latch member 27 is shortened so as not to interfere with the yoke 49c. Yoke 49c transmits, at least partially, the stresses applied to the hook portion 49 or to the connecting portion 48. The overall strength of the hook member 45 is increased because stresses applied to the hook member 45 are uniformly spread over each of the connecting portions 48a and 48b or to the hook portions 49a and 49b.

In the constructions illustrated in FIGS. 5 and 6, the hook member 45 is reinforced by side members 63 which are connected to opposite lateral sides of the hook portions 49, the connecting portion 48 and the base portion 47 and may also be connected to the case 26. The side members 63 will reinforce the hook member 45 thereby improving its ability to retain the distal end 36 of the lock bar 35 and will laterally retain the distal end 36 in order to reduce the lateral stresses exerted on the latch member 27. This construction relieves the latch member 27 of any stresses other than those caused by normal operation of the thrust reverser door.

Figure 7:
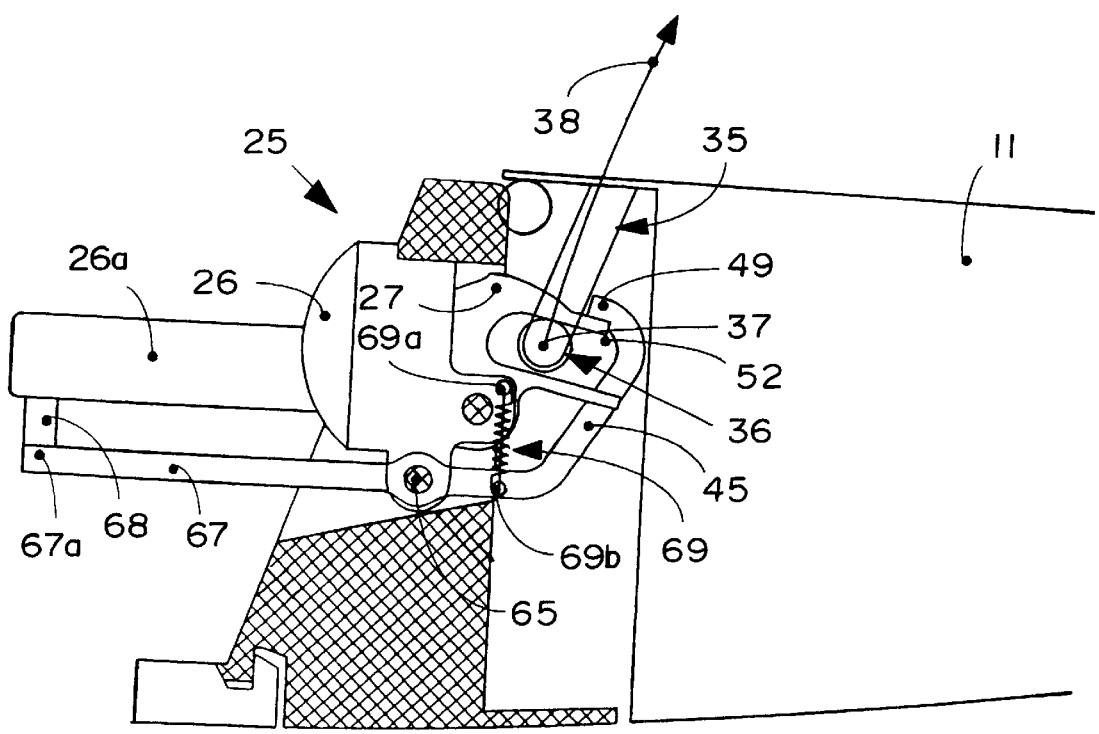
FIG. 7 is a cross-sectional view of a fourth embodiment of the latching mechanism according to the present invention.

Another alternative embodiment of the present invention is illustrated in FIG. 7. In this embodiment, the latching mechanism prevents inadvertent deployment of the thrust reverser door from the forward thrust position in case of an engine fire. As can be seen, the hook member 45 is pivotally connected to the case 26 by pivot 65 located on the inner side of the case 26. The pivot 65 pivots about a pivot axis extending substantially parallel to the axis 37 of the distal end 36 on the lock bar 35. It is to be understood that the hook member 45 has hook portion 49 which extends back towards the casing 26. Hook member 45 extends beyond the pivot 65 by arm 67 having an end 67a that is connected to the case portion 26a by a fusible link 68. The hook member 45 is pivotable between a displaced position, as illustrated in FIG. 7, in which the hook portion 49 is displaced away from the distal end 36, and an engaged position in which the hook portion 49 engages or contacts the distal end 36 to prevent deployment of the thrust reverser door 11 from the forward thrust position. Spring 69 biases the hook member 45 toward the engaged position. Fusible link 68 normally holds the hook member 45 in the displaced position thereby allowing normal operation of the thrust reverser door 11. In the case of an engine fire, the heat from the fire will melt the fusible link 68, thereby enabling the biasing spring 69 to move the hook member 45 to the engaged position to prevent deployment of the thrust reverser door 11. Clearance 52, normally maintained between the distal end 36 and the hook portion 49 enables the hook member 45 to pivot about its axis 65 without mechanical interference between the distal end 36 and the hook member 45.

In the embodiment illustrated, the lock mechanism 25 includes a casing 26a for a linear actuator located at one side of the lock device 25. In such instances, it is advantageous to elongate the arm 67 and to connect the end 67a to the casing portion 26a by the thermally fusible link 68 in order to reduce the tension which must be withstood by the fusible link 68 and to increase the ability of the hook member 45 to retain the thrust reverser door 11 when the structure has been damaged. The relative positions of the case 26 and the arm 67 may enable other modifications. Although the fusible link 68 has been illustrated as a tensioned fusible element, it may also be possible to utilize the fusible element under compression, or under shear.

Although the present invention has been described in terms of thrust reverser doors in which the forward portions open outwardly from the engine cowling, it should be noted that the principles elucidated herein are also applicable to thrust reverser doors in which the forward portion moves inwardly into the gas flow duct.

The foregoing descriptions have been provided for illustrative purposes only and should not be construed as in any way limiting this invention, the scope of which is defined by the appended claims.

We claim:

1. A latching mechanism for a jet engine thrust reverser having at least one thrust reverser door movably connected to an engine cowling with a reverse thrust opening, the at least one thrust reverser door being movable between a forward thrust position in which the at least one thrust reverser door covers the reverse thrust opening and a reverse thrust position in which the reverse thrust opening is uncovered, the latching mechanism comprising:

a) a lock bar mounted on one of the at least one thrust reverser door and the cowling, the lock bar having a distal end;

b) a lock device including a latch member pivotally located on at least one of the thrust reverser door and the cowling, the latch member having a slot engaged by the distal end of the lock bar when the at least one thrust reverser door is in the forward thrust position, the latch member being movable between a latched position wherein the latch member prevents disengagement of the distal end of the lock bar from the slot so as to latch the at least one thrust reverser door in the forward thrust position, and an unlatched position which permits disengagement of the distal end of the lock bar from the slot; and, c) a hook member mounted on a sub-assembly of the cowling and the lock device, the hook member defining an opening through which the distal end of the lock bar passes when the at least one thrust reverser door moves into the forward thrust position such that the hook member encloses the distal end of the lock bar, the opening being closed by the latch member of the lock device when in the latched position such that the distal end of the lock bar is trapped within the slot regardless of any relative movement between the cowling and the at least one thrust reverser door away from each other.

2. The latching mechanism of claim 1 wherein the latch member is actuated by a lock device having a case and wherein the hook extends from the case.

3. The latching mechanism of claim 1 wherein the hook member comprises a housing having an interior space in which the latch member is located.

4. The latching mechanism of claim 1 wherein the hook member comprises a base portion located so as to contact the distal end of the lock bar when the at least one thrust reverser door is in the forward thrust position.

5. The latching mechanism of claim 1 wherein the latch member comprises a spring biased over-center latch member.

6. The latching mechanism of claim 1 wherein the hook member comprises a base portion, a hook portion and a connecting portion connecting the hook portion to the base portion.

7. The latching mechanism of claim 6 wherein the hook portion has a second slot therein which is engaged by portions of the latch member when the latch member is in the latched position to prevent lateral deformation of the latch member.

8. The latching mechanism of claim 6 wherein the hook member comprises a second slot and the latch member has two legs bounding opposing sides of the slot, each leg having a distal end portion engaging the second slot when the latch member is in the latched position.

9. The latching mechanism of claim 7 further comprising a yoke extending across a portion of the second slot connecting the hook portions on opposite sides of the second slot.

10. The latching mechanism of claim 6 further comprising:

lateral side members on opposite lateral sides of the hook member, each lateral side member being connected to the base, connecting and hook portions of the hook member.

11. The latching mechanism of claim 2 wherein the hook member is pivotally connected to the case so as to be movable between a displaced position in which the hook member is displaced from the distal end of the lock bar, and an engaged position wherein the hook member engages the distal end of the lock bar to prevent the at least one thrust reverser door from moving from the forward thrust position.

12. The latching mechanism of claim 11 further comprising:

a) a biasing element acting on the hook member so as to bias the hook member toward the engaged position; and, b) a fusible link connected to the hook member so as to hold the hook member in the displaced position.

13. The latching mechanism of claim 1 wherein the lock bar is mounted on the at least one thrust reverser door and the distal end moves along a path of travel as the at least one thrust reverser door moves between the forward and reverse thrust positions and wherein the hook member comprises a bearing surface located adjacent to the distal end when the at least one thrust reverser door is in the forward thrust position, the bearing surface extending substantially parallel to the path of travel.

\* \* \* \* \*